United States Patent [19]

Cherry et al.

[11] Patent Number: 4,744,622

[45] Date of Patent: May 17, 1988

[54] OPTICAL FIBER SPLICE CASE

[75] Inventors: Hitesh Cherry, Harrisburg; Walter M. Werner, Downingtown, both of Pa.

[73] Assignee: AMP Incorporated, Harrisburg, Pa.

[21] Appl. No.: 907,289

[22] Filed: Sep. 12, 1986

[51] Int. Cl.[4] .............................................. G02B 6/36
[52] U.S. Cl. .............................. 350/96.20; 350/96.23
[58] Field of Search .............. 350/96.10, 96.20, 96.21, 350/96.22, 96.23

[56] References Cited

U.S. PATENT DOCUMENTS

| | | | |
|---|---|---|---|
| 3,624,594 | 11/1971 | Malvern et al. | 339/116 C |
| 3,681,512 | 8/1972 | Werner et al. | 174/84 R |
| 4,029,895 | 6/1977 | Scarborough | 174/138 F |
| 4,146,299 | 3/1979 | Wellington et al. | 350/96.21 |
| 4,209,227 | 6/1980 | Dubos et al. | 350/96.22 |
| 4,217,028 | 8/1980 | Reh et al. | 350/96.20 |
| 4,348,076 | 9/1982 | Oldham | 350/96.22 |
| 4,355,862 | 10/1982 | Kock | 350/96.20 |
| 4,607,911 | 8/1986 | Rhodes | 350/96.20 |
| 4,674,833 | 6/1987 | Des Forges et al. | 350/96.21 |

*Primary Examiner*—John Lee
*Attorney, Agent, or Firm*—Allan B. Osborne

[57] ABSTRACT

An optical fiber splice case for joining composite cables having optical fibers in a tube surrounded by wire strands. More particularly the splice case includes a body having a chamber for receiving spliced together optical fibers and separate cable gripping assemblies which grip the wire strands and which are secured to the body. The cable gripping assemblies include elongated jaws which collectively form a cylindrical member which is compressed down around the wire strands to withstand high tensile forces.

6 Claims, 3 Drawing Sheets

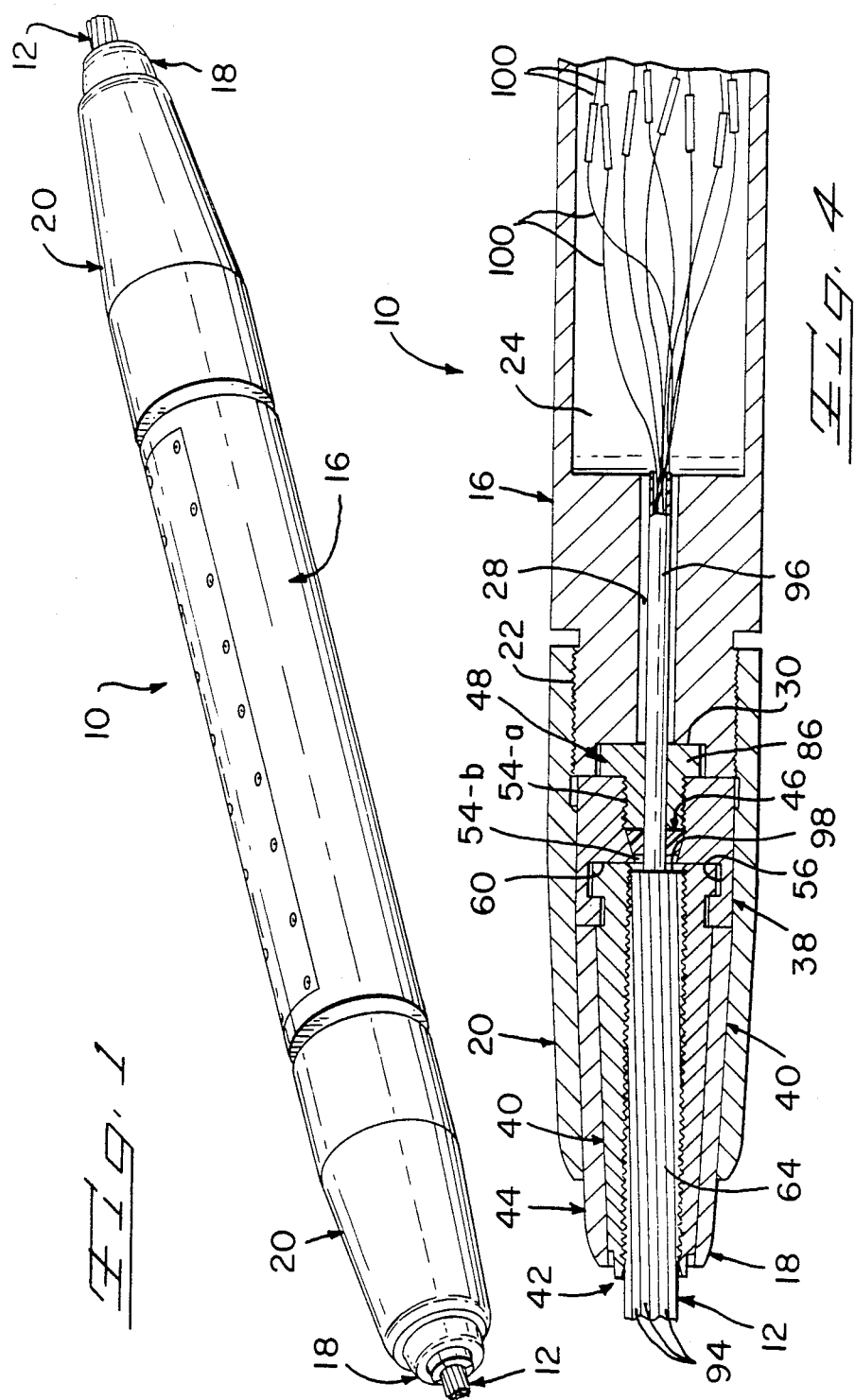

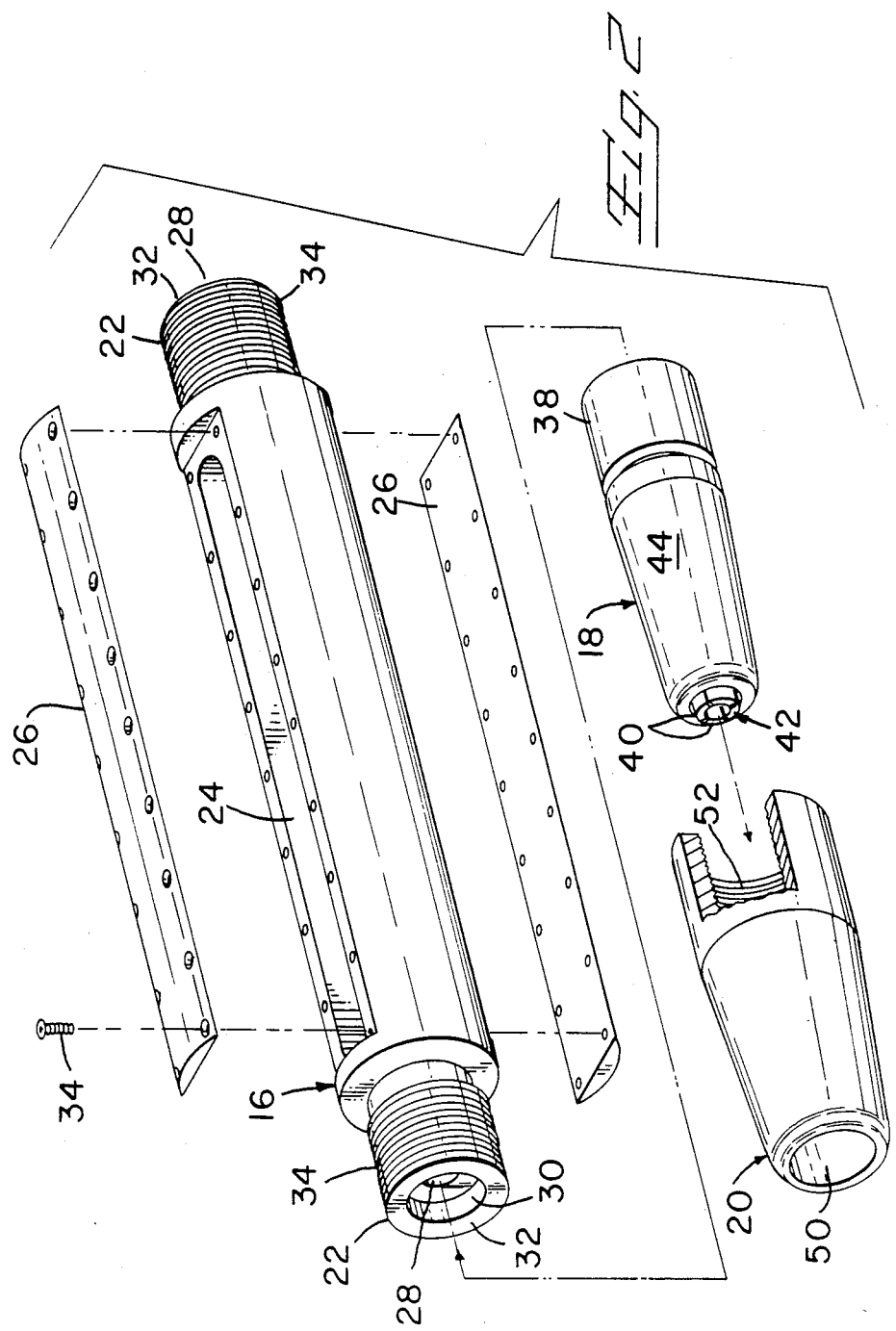

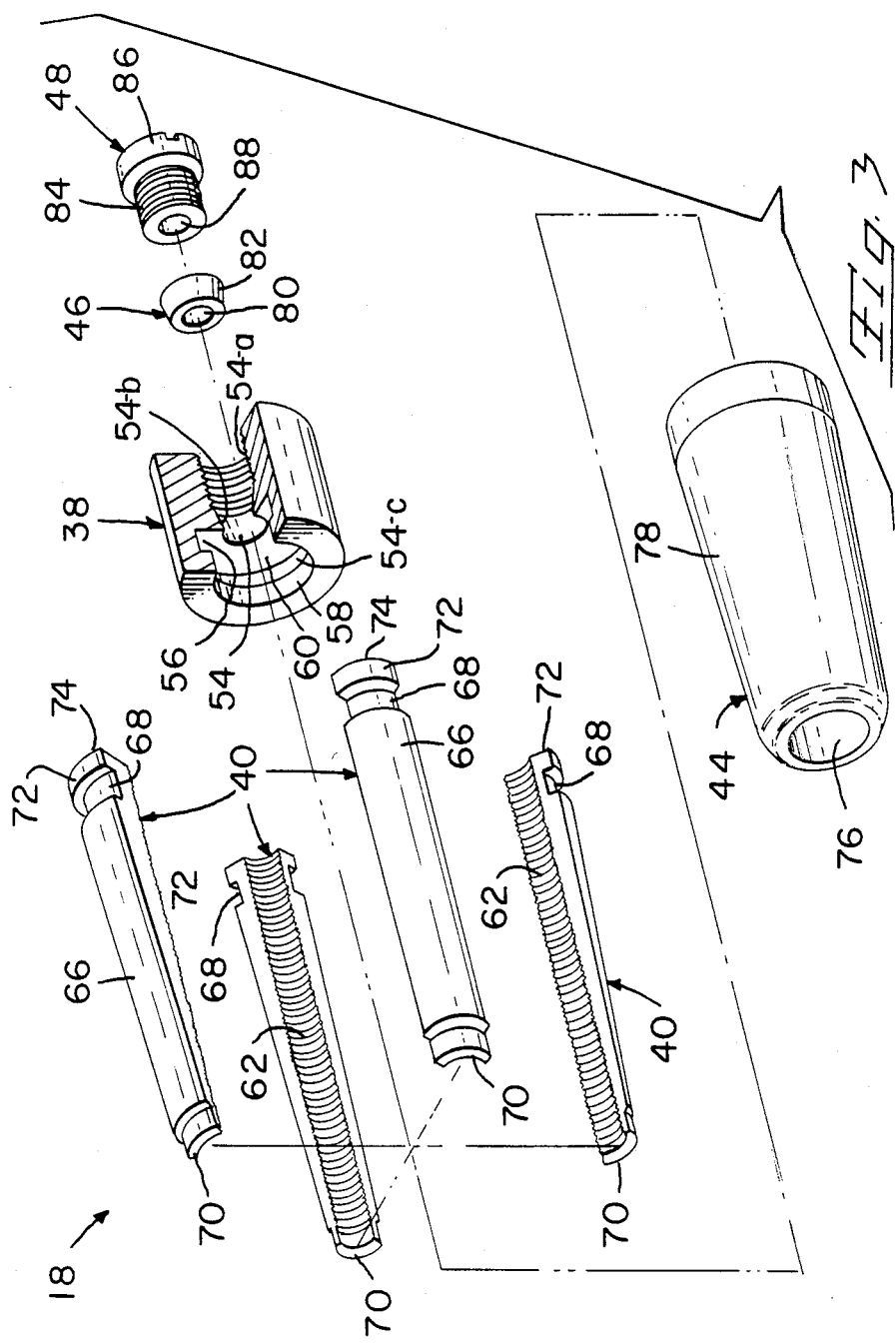

OPTICAL FIBER SPLICE CASE

FIELD OF THE INVENTION

This invention relates to a splice case in which a cable gripping assembly at each end secures cables entering into the case which contains a chamber for housing optical fibers spliced together.

BACKGROUND OF THE INVENTION

It is now becoming more popular to use composite cables of the type in which several optical fibers are contained within a tube with wire strands helically encircling the tube for protection. As such cable is manufactured in finite lengths however, a need has arisen to join cable lengths together in a way which will withstand high tensile forces and also provide maximum protection to the delicate optical fibers and the splice connections therebetween.

It is now proposed to provide a splice case having a chamber for receiving spliced optical fibers and cable gripping assemblies at each end of the case for gripping the wire strands.

SUMMARY OF THE INVENTION

According to the invention, an optical fiber splice case is provided which includes an elongated body, cylindrical cable gripping assemblies and securing caps. The body includes a chamber intermediate the ends for spliced optical fibers. The ends are adapted to receive the cylindrical assemblies in cooperation with the securing caps. Each assembly includes a support housing for supporting a plurality of jaws which collectively form the cylindrical member which is compressed down around the wire strands in cooperation with a compression cone. Resilient bushings positioned in the support housing are compressed around the fiber-containing tubes to provide an environmental seal to the chamber.

BRIEF DESCRIPTION OF THE DRAWINGS

FIG. 1 is a perspective view of the optical fiber splice case of the present invention with a composite cable entering therein from each end;

FIG. 2 is an exploded perspective view of the splice case showing the components thereof;

FIG. 3 is an exploded perspective view of the cylindrical cable gripping assembly; and FIG. 4 is a sectional view of a segment of the splice case of FIG. 1.

DESCRIPTION OF THE INVENTION

Splice case 10 of the present invention provides a means for joining two composite cables 12 and the optical fibers therein and holding them together against high tensile forces such as experienced by transmission cable suspended between high tension towers.

As shown in FIG. 1, splice case 10 includes an elongated body 16, a cable gripping assembly 18 at each end of body 16 and conical caps 20 securing the cable gripping assemblies 18 to body 16.

As shown in FIG. 2, body 16, preferably made from aircraft type aluminum such as 6061-T-6, has threaded end sections 22 and splice chamber 24 with two openings thereto coverable by covers 26. Passages 28 extend through end sections 22, opening into recesses 30 at the outer faces 32 and into chamber 24. Covers 26 are secured to body 16 by machine screws 34 with a gasket (not shown) in between.

Cable gripping assembly 18 (only one being shown in FIGS. 2, 3 and 4) includes support housing 38, a plurality of jaws 40 forming cylindrical member 42, compression cone 44 and, as shown in FIGS. 3 and 4 bushing 46 and bushing retaining bolt 48. A detailed description will be given below with reference to FIG. 3.

Cap 20 (only one being shown in FIGS. 2 and 4), preferably made from 6061-T-6 aluminum, is provided with tapered passage 50 and straight, threaded passage 52, both of which are connected and coaxial.

Cable gripping assembly 18 will now be described with reference to FIG. 3. As shown therein, support housing 38 is provided with passage 54 with portion 54-a being threaded. Inwardly from portion 54-a is tapered portion 54-b which opens into counterbore portion 54-c. An annular, inwardly open groove 56 and inwardly projecting, annular flange 58 are provided within counterbore portion 54-c. Outwardly facing shoulder 60 defines the change between portions 54-b and 54-c.

Jaws 40 are made so that upon being assembled together (FIG. 4) they collectively form the aforementioned cylindrical member 42 with serrated inner surfaces 62 of each jaw 40 collectively defining passage 64 (FIG. 4). Outer surfaces 66 are longitudinally beveled with respect to inner surfaces 62 so that cylindrical member 42 is tapered with the taper being from annular groove 68 to end 70. Groove 68 defines flange 72 adjacent end 74.

In order to form a cylinder, each jaw 40 has a curved or arcuate shape normal to the longitudinal axis and outer surface 66 is wider than inner surface 62. The degree of curvature is determined by the diameter of composite cable 12 to be gripped by assembly 18.

Four jaws 40 are shown; however, any number including two could be utilized in the same manner.

Compression cone 44 is provided with tapered passage 76 which complements the taper of cylindrical member 42. Outer surface 78 is tapered to conformably fit into tapered passage 50 of cap 20.

Support housing 38, jaws 40 and cone 44 are preferably made from 6061-T-6 aluminum.

Bushing 46, made from a resilient material such as rubber, is provided with passage 80 and a tapered outer surface 82 which is conformably received in tapered portion 54-b of passage 54 in support housing 38.

Bushng retaining bolt 48 includes a threaded shaft 84, an enlarged head 86 and is provided with passage 88 therethrough. Head 86 may be slotted as shown or have flats thereon for gripping with a wrench. Bolt 48 is preferably made from 6061-T-6 aluminum.

Prior to use, jaws 40 are assembled to support housing 38 by placing flanges 72 into groove 56 and with inwardly projecting flange 58 of counterbore 54-c being received in grooves 68 on jaws 40. A spacer (not shown) is placed in passage 64 of the now formed cylindrical member 42 and a band (not shown) is placed around member 42 to keep jaws 40 intact.

With reference to FIG. 4, composite cable 12 is prepared by removing a length of wire strands 94 from around aluminum tube 96 and scoring tube 96 at intervals but leaving unscored a length, measured from cut face 98 of strands 94 equal to the combined lengths of passage portions 54-a, 54-b in support housing 38 and passage 28 in body 16. As is well known, care must be exercised in scoring tube 96 not to damage optical fibers 100 therewithin.

In securing prepared cable 12 to splice case 10, conical cap 20 and compression cone 44 are slid on over strands 94 in that order and in the orientation depicted in FIGS. 2 and 4. Next, with the aforementioned but not shown spacer and band removed, the cylindrical member 42 - support housing 38 assembly is placed on cable 12 with cut face 98 of wire strands 94 adjacent shoulder 60 in counterbore 54-c of passage 54 in support housing 38. Strands 94 will be in passage 64 of cylindrical member 42 and tube 96 will extend through passage 54 in support housing 38.

Cylindrical member 42 is then compressively forced tightly around strands 94 in passage 64 by driving compression cone 44 onto member 42 by the use of a power tool (not shown) such as disclosed in U.S. Pat. No. 4,408,926.

Bushing 46 and bolt 48 are slid onto tube 96 and secured in passage portions 54-b and 54-a respectively. As bolt 48 is tightened in threaded portion 54-a, bushing 46 is compressed in tapered portion 54-b and around tube 96 to provide an environmentally tight seal in passage 54. This completes the forming of cable gripping assembly 18.

The next step requires feeding the length of tube 96 extending outwardly from assembly 18 through passage 28 and into chamber 24. With support housing 38 abutting outer face 32 of end section 22 and bolt head 86 on bolt 48 entering recess 30 therein, assembly 18 is secured to body 16 by sliding conical cap 20 over assembly 18 and threading it onto end section 22.

After repeating the above-described steps for a second cable 12 on the other end of body 16, the length of tubes 96 of both cables 12 which are in chamber 24 are broken away on the score lines or cut through to free optical fibers 100 so that they can be spliced together as shown in FIG. 4. Bolting covers 26 onto body 16 completes the splicing and securing of two composite cables 12.

As can be discerned, an optical fiber splice case for joining composite cable has been disclosed. The splice case includes an elongated body containing a splice chamber and threaded end sections to which cable gripping assemblies are secured by means of conical caps being threadedly received thereon. The cable gripping assemblies include a support housing for supporting a cylindrical member formed from several elongated jaws which are compressed down around the cable in a tight grip which will withstand high tensile forces experienced by such splice cases when in service. Resilient bushings in the cable gripping assemblies provide an environmentally tight seal for the splice chamber along with gaskets under the chamber covers.

We claim:

1. An optical fiber splice case for composite cable of the type having a plurality of optical fibers within a tube and wire strands surrounding the tube, said case comprising:

elongated body means having a chamber intermediate the ends and passages extending from the ends to said chamber through which the tubes may extend;

cable gripping assemblies for being positioned against said ends of said body means and for gripping the wire strands of the composite cable, said assemblies each including;

support means having a passage therethrough with first and second openings at respective ends of said passage and with said second opening having jaw retaining means;

resilient bushing means and bushing retaining means, for being positioned in said first opening to said passage in said support means, said bushing means adapted to be compressed in said first opening and around the tube of the composite cable which may extend through said passage in said support means by said bushing retaining means;

a plurality of discrete elongated jaw means having one surface beveled relative to an opposite surface, said plurality of jaw means forming in cooperation with each other a reusable cylindrical member having a passage therethrough and a tapered outer surface, said jaw means further having retaining means at one end for cooperative engagement with said jaw retaining means in said second opening in said support means to thereby position and retain said cylindrical member in an outwardly projecting manner from said support means;

compression means having a tapered passage therethrough and adapted to be slidingly driven onto and compress said cylindrical member into a tight grip on the wire strands of the composite cable surrounding the tube; and securing means having a tapered passage in one end to be conformably and lockingly received over said cable gripping assemblies and cooperative attaching means in another end for attaching said securing means to said ends of said body means to thereby secure said cable gripping assemblies to said body means.

2. The optical fiber splice case of claim 1 wherein said first opening in said support means includes a tapered portion and said bushing means has a tapered outer surface to conformably fit therein.

3. The optical fiber splice case of claim 2 wherein said bushing means and bushing retaining means have tube-receiving passages therethrough.

4. The optical fiber splice case of claim 1 wherein the ends of said body means and said attaching means in said securing means include complementary threads for attaching said securing means to said body means.

5. The optical fiber splice case of claim 4 wherein said securing means include a generally conical cap.

6. The optical fiber splice case of claim 1 wherein said chamber is accessible through an opening in said body means and further including cover means for covering said opening.

* * * * *